(12) United States Patent
Kitazoe

(10) Patent No.: US 9,544,828 B2
(45) Date of Patent: Jan. 10, 2017

(54) HANDOVER FAILURE PROCEDURES IN COMMUNICATION SYSTEMS

(75) Inventor: Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 12/328,606

(22) Filed: Dec. 4, 2008

(65) Prior Publication Data

US 2009/0149180 A1    Jun. 11, 2009

Related U.S. Application Data

(60) Provisional application No. 60/992,658, filed on Dec. 5, 2007.

(51) Int. Cl.
| H04W 4/00 | (2009.01) |
| H04L 12/26 | (2006.01) |
| H04W 36/00 | (2009.01) |
| H04M 3/42 | (2006.01) |
| H04W 36/26 | (2009.01) |

(52) U.S. Cl.
CPC .................................. *H04W 36/26* (2013.01)

(58) Field of Classification Search
CPC .................................................... H04W 36/26
USPC .................... 370/331; 455/436, 422.1, 414.1
See application file for complete search history.

(56) References Cited

U.S. PATENT DOCUMENTS

| 5,574,968 | A | 11/1996 | Olds et al. |
| 5,940,761 | A | 8/1999 | Tiedemann, Jr. et al. |
| 6,246,872 | B1* | 6/2001 | Lee et al. .................... 455/414.1 |
| 6,584,325 | B1 | 6/2003 | Shakhgildian |
| 7,200,398 | B1* | 4/2007 | Xu et al. ......................... 455/436 |
| 7,319,661 | B1* | 1/2008 | Bohossian et al. ........... 370/216 |
| 8,644,252 | B2 | 2/2014 | Wager |
| 2005/0239472 | A1* | 10/2005 | Wei ............................. 455/452.2 |
| 2006/0172759 | A1 | 8/2006 | Ishihara |
| 2007/0072611 | A1 | 3/2007 | Feder et al. |
| 2007/0072614 | A1 | 3/2007 | Forsberg |
| 2007/0149196 | A1 | 6/2007 | Choi et al. |
| 2007/0173244 | A1* | 7/2007 | Xu et al. ..................... 455/422.1 |
| 2009/0061878 | A1* | 3/2009 | Fischer ......................... 455/436 |

(Continued)

FOREIGN PATENT DOCUMENTS

| CN | 101507330 A | 8/2009 |
| JP | H05508524 A | 11/1993 |

(Continued)

OTHER PUBLICATIONS

International Search Report—PCT/US2008/085659—International Search Authority—European Patent Office, Jul. 20, 2009.

(Continued)

*Primary Examiner* — Kiet Tang
(74) *Attorney, Agent, or Firm* — Anthony R. Morris

(57) ABSTRACT

When a handover failure occurs and/or is anticipated to occur, an optimized cell can be selected and user equipment can transfer to the optimized cell. This optimized cell can differ from a previous cell based upon various factors such as anticipated interference and load balancing. Once there is identification of a handover failure a cell can return to a previous frequency and an appropriate cell can be determined. Instruction of the cell that should be used can be determined by user equipment as well as from a network entity.

15 Claims, 15 Drawing Sheets

(56) References Cited

U.S. PATENT DOCUMENTS

2009/0312021 A1* 12/2009 Kim .............................. 455/436

FOREIGN PATENT DOCUMENTS

| | | |
|---|---|---|
| JP | H09512141 A | 12/1997 |
| JP | 2003528507 A | 9/2003 |
| JP | 2004349976 A | 12/2004 |
| JP | 2005229417 A | 8/2005 |
| JP | 2006165972 A | 6/2006 |
| KR | 20070061407 A | 6/2007 |
| RU | 2277762 | 6/2006 |
| WO | WO-9210914 A1 | 6/1992 |
| WO | WO-9528808 A1 | 10/1995 |
| WO | WO-9832262 A2 | 7/1998 |
| WO | WO-0172081 A1 | 9/2001 |
| WO | WO0232179 A1 | 4/2002 |
| WO | WO2004114691 | 12/2004 |
| WO | WO2006123863 A2 | 11/2006 |
| WO | WO2006130063 A1 | 12/2006 |
| WO | WO2008024064 A2 | 2/2008 |

OTHER PUBLICATIONS

QUALCOMM Europe: "Forward Handover Considerations (doc No. R2-062950)" QUALCOMM, Oct. 9, 2006, pp. 1-6.

Samsung, "Handover Procedure for LTE Active Ues (doc No. R2-060078)," 3rd Generation Partnership Project (3GPP) Technical Specification Group (TSG) Radio Access Network (RAN); Workinggroup 2, 50th Meeting, Jan. 13, 2006.

Written Opinion—PCT/US2008/085659, International Search Authority, European Patent Office, Jul. 20, 2009.

European Search Report—EP11175377—Search Authority—The Hague—Nov. 3, 2011.

International Search Report and Written Opinion—PCT/US2008/085689—ISA/EPO—Jul. 20, 2009.

Taiwan Search Report —TW097147530—TIPO—Jan. 31, 2012.

Ericsson,"Details of the handover procedure",3GPP TSG-RAN WG2 #60 Tdoc R2-074922,Nov. 2007,p. 1-p. 6,URL,http://www.3gpp.org/ftp/tsg_ran/WG2_RL2/TSGR2_60/Docs/R2-074922.zip.

NTT Docomo: "RRC Re-establishment Procedure," R2-061928; 3rd Generation Partnership Project (3GPP) TSG-RAN WG2 Ad-hoc on LTE; XP-002488901, (Jun. 27, 2006), pp. 1-6.

Taiwan Search Report—TW097147530—TIPO—Aug. 28, 2012.

QUALCOMM Europe, "Intra-eNB cell selection in the target eNB", 3GPP TSG-RAN WG2 meeting #56 R2-063115, Nov. 6, 2006.

Zeng Q.A et al., "Handoff in Wireless Mobile Networks" Chapter 1, Dec. 5, 2001, pp. 1-26.

* cited by examiner

HANDOVER FAILURE PROCEDURES IN COMMUNICATION SYSTEMS

This application claims priority to U.S. Application No. 60/992,658 entitled "HANDOVER FAILURE PROCEDURES IN COMMUNICATION SYSTEMS", which was filed on Dec. 5, 2007. The entirety of which is herein incorporated by reference.

BACKGROUND

I. Field

The following description relates generally to wireless communications and, more particularly, to operation regarding user equipment upon a handover failure.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to one aspect, there can be a method for managing a wireless communication handover. The method can include identifying a handover failure in relation to user equipment transferring among base stations. Moreover, the method can embrace selecting am optimized cell upon which to apply to the user equipment when the handover failure is identified.

In another aspect, there can be an apparatus that includes an identifier that identifies a handover failure in relation to user equipment transferring among base stations. The apparatus can also include a designator that selects an optimized cell upon which to apply to the user equipment when the handover failure is identified.

With a further aspect, an apparatus can be employed with means for identifying a handover failure in relation to user equipment transferring among base stations. The apparatus can also employ means for selecting an optimized cell upon which to apply to the user equipment when the handover failure is identified.

With yet another aspect, there can be a computer program product with a computer-readable medium. The medium can encompass a set of codes for identifying a handover failure in relation to user equipment transferring among base stations. Another set of codes can be for selecting an optimized cell upon which to apply to the user equipment when the handover failure is identified.

In an additional aspect, can include at least one processor configured to manage a wireless communication handover. The processor can retain a module for identifying a handover failure in relation to user equipment transferring among base stations. Another module can be for selecting an optimized cell upon which to apply to the user equipment when the failure is identified.

According to one aspect, there can be a method for managing operation of user equipment. The method can include anticipating a handover failure for user equipment. Additionally, the method can encompass instructing the user equipment on how to operation based upon the anticipated handover failure.

In another aspect, there can be an apparatus with a predictor that anticipates a handover failure for user equipment. The apparatus can include a transmitter that instructs the user equipment on how to operation based upon the anticipated handover failure.

With a further aspect, an apparatus can be employed with means for anticipating a handover failure for user equipment. The apparatus can also employ means for instructing the user equipment on how to operation based upon the anticipated handover failure.

With yet another aspect, there can be a computer program produce comprising a computer-readable medium. The computer-readable medium can comprise a set of codes for anticipating a handover failure for user equipment. The medium can also comprise a set of codes for instructing the user equipment on how to operation based upon the anticipated handover failure.

In an additional aspect, there can be at least one processor configured to manage operation of user equipment. The processor can include a module for anticipating a handover failure for user equipment. The processor can also include a module for instructing the user equipment on how to operation based upon the anticipated handover failure.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
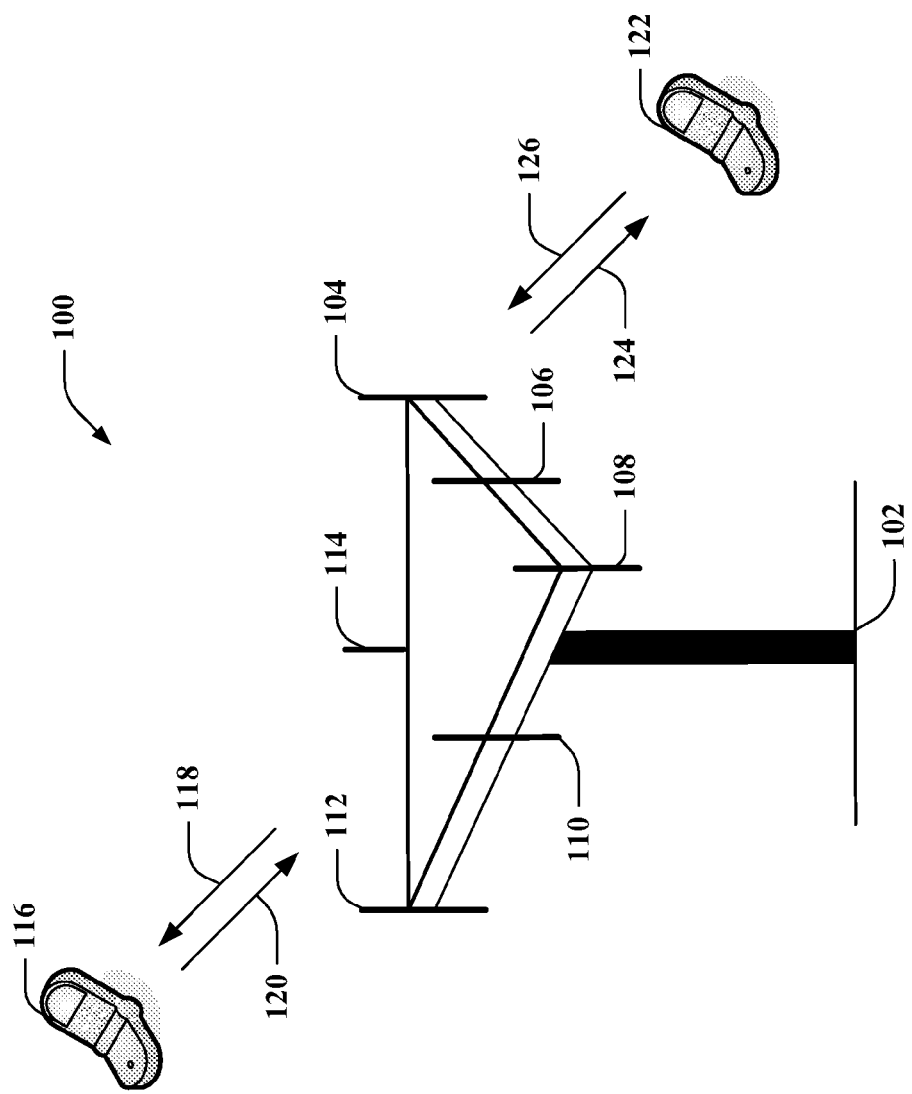
FIG. 1 is an illustration of a wireless communication system in accordance with various aspects set forth herein.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
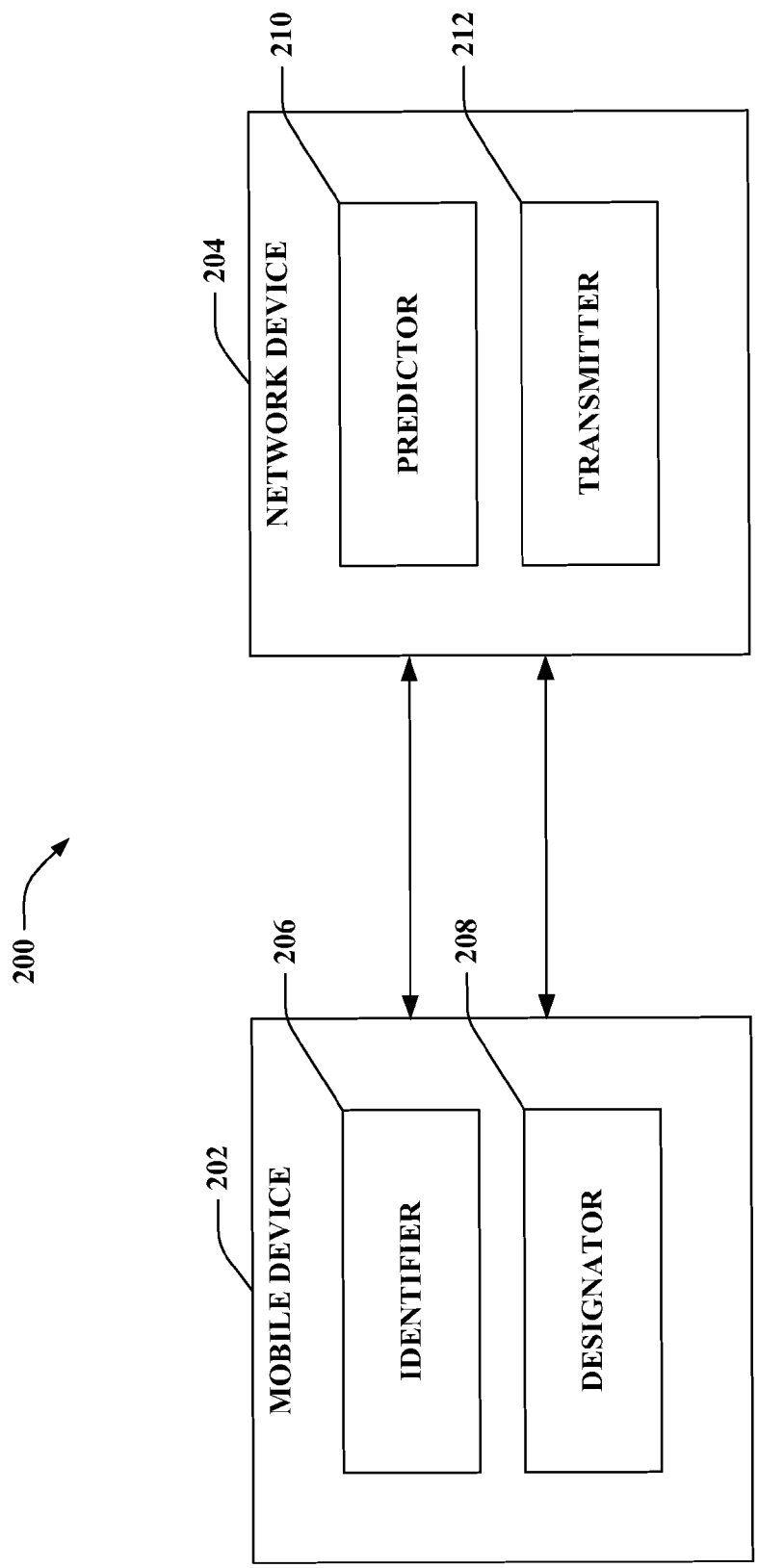
FIG. 2 is an illustration of a representative system for managing handover failure in accordance with at least one aspect disclosed herein.

Now referring to FIG. 2, an example system 200 is disclosed for processing a communication handover failure. A mobile device 202 can engage with a network device 204 (e.g., base station, central server, etc.) to facilitate communication. Movement of the mobile device 202 can occur such that the mobile device 202 should switch to a different base station. Additionally, switching can be facilitated by changes in frequency, load balancing, and the like. Therefore, at an appropriate time, a handover attempt can occur such that the mobile device 202 should transfer from one base station to another.

However, it is possible that there is a handover failure such that the mobile device does not successfully transfer to a desired base station. Under conventional principles, the mobile device 202 returns to the previous cell (e.g., cell of a base station)—the cell the mobile device 202 engages prior to experiencing the failure. This operation does not take into consideration if the previous cell is an appropriate location for the mobile device 202.

To improve operation, a cell can be selected (e.g., intelligently selected through artificial intelligence techniques) upon occurrence or prediction of the handover failure. An optimized cell can be selected based upon desires of the mobile device 202, such as a cell with lowest interference, and/or based upon network desires, such as appropriate load balancing. It is to be appreciated that the cell selected can be the previous cell; however, the selection can be based upon the previous cell being an optimized cell and not upon the fact that it is the previous cell. Selection and associated operation can occur upon the mobile device 202, network device 204, a third-party device, distributed across different device including devices of different types, and the like.

The mobile device 202 can perform selection for itself and/or for other mobile devices. An identifier 206 can be employed that appreciates (e.g., become aware of, identifies, etc.) a handover failure in relation to user equipment (e.g., the mobile device 202) transferring among base stations. Upon performing the appreciation, a designator 208 can select a cell upon which to apply to the user equipment.

Selection can also occur through the network (e.g., through operation of the network device 204). A predictor 210 can be employed that anticipates a handover failure for user equipment. Anticipation can include expecting a failure to occur (e.g., through analysis of network metadata) as well as through identifying an occurring failure or occurred failure. Additionally, there can be use of a transmitter 212 that instructs the user equipment on how to operate based upon the anticipated handover failure. The instruction can be on a particular cell to use, a frequency to use, when transfer should take place (e.g., immediately, after a specified delay), and the like.

Figure 3:
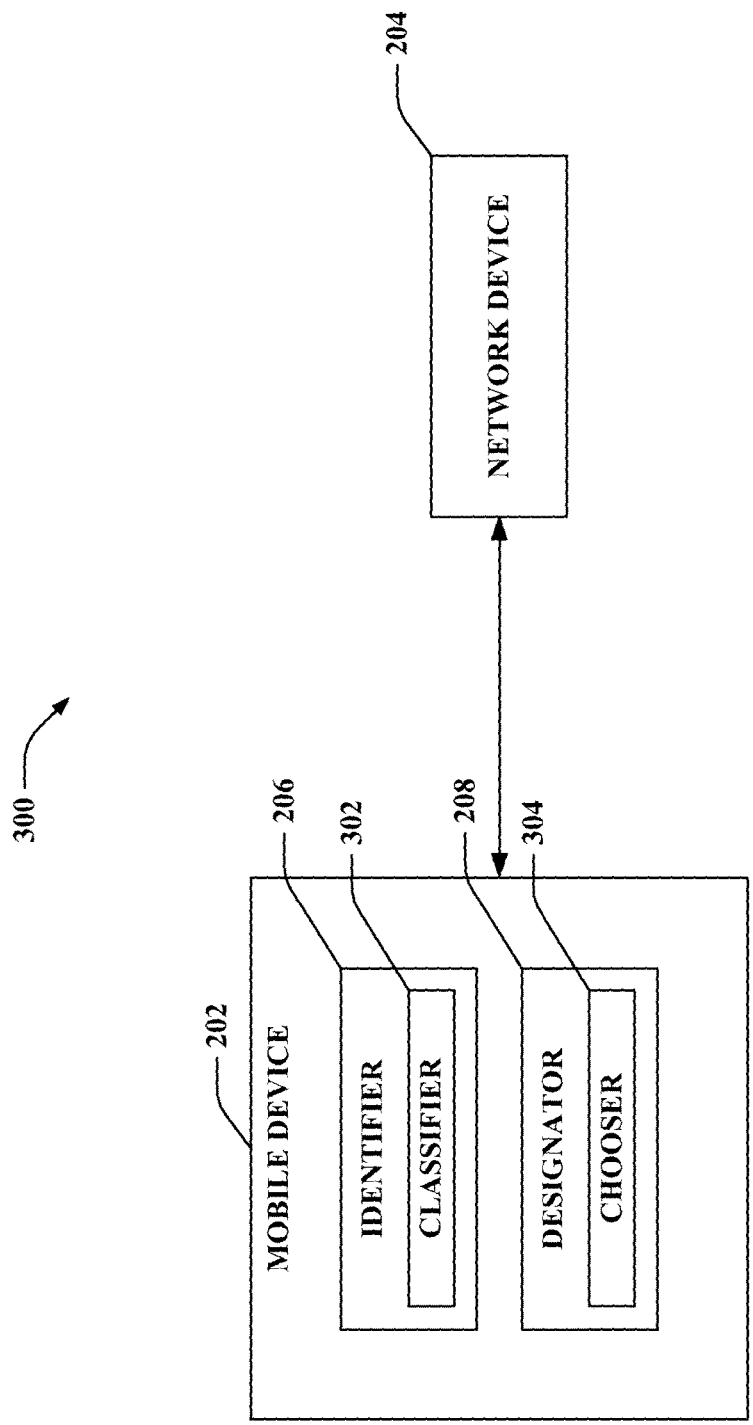
FIG. 3 is an illustration of a representative system for selecting an appropriate cell in relation to a handover failure in accordance with at least one aspect disclosed herein.

Referring now to FIG. 3, an example system 300 is disclosed for performing processing regarding a handover failure. A mobile device 202 and network device 204 can correspond with one another during a communication session. An identifier 206 can determine that there is a handover failure through use of a classifier 302. The classifier 302 can collect metadata, perform analysis upon the collected metadata, and determine that there is the handover failure based upon a result of the analysis. In one implementation, the classifier 302 can evaluate the metadata and make an independent determination that a failure occurs and/or is anticipated to occur. However, in another implementation the classifier 302 can process the notice emitted by the network device 204 to determine the failure.

Selection of a cell can be performed in an optimized manner such that an optimized cell is selected—a chooser 304 used by a designator 208 can be employed that selects an optimized cell. For example, selection of the cell can take place such that a minimal amount of resources are used in selecting a cell. In addition, a cell can be selected that minimizes interference of a communication engaged by the mobile device 202, increases security of the communication, minimizes a likelihood of a communication failure (e.g., communication breakdown), etc. It is to be appreciated that an optimized cell can be optimized based upon different factors and interests, such as an optimized cell for the mobile device 202, an optimized cell for the network, a cell that balances interests of the mobile device 202 and the network, etc.

Figure 4:
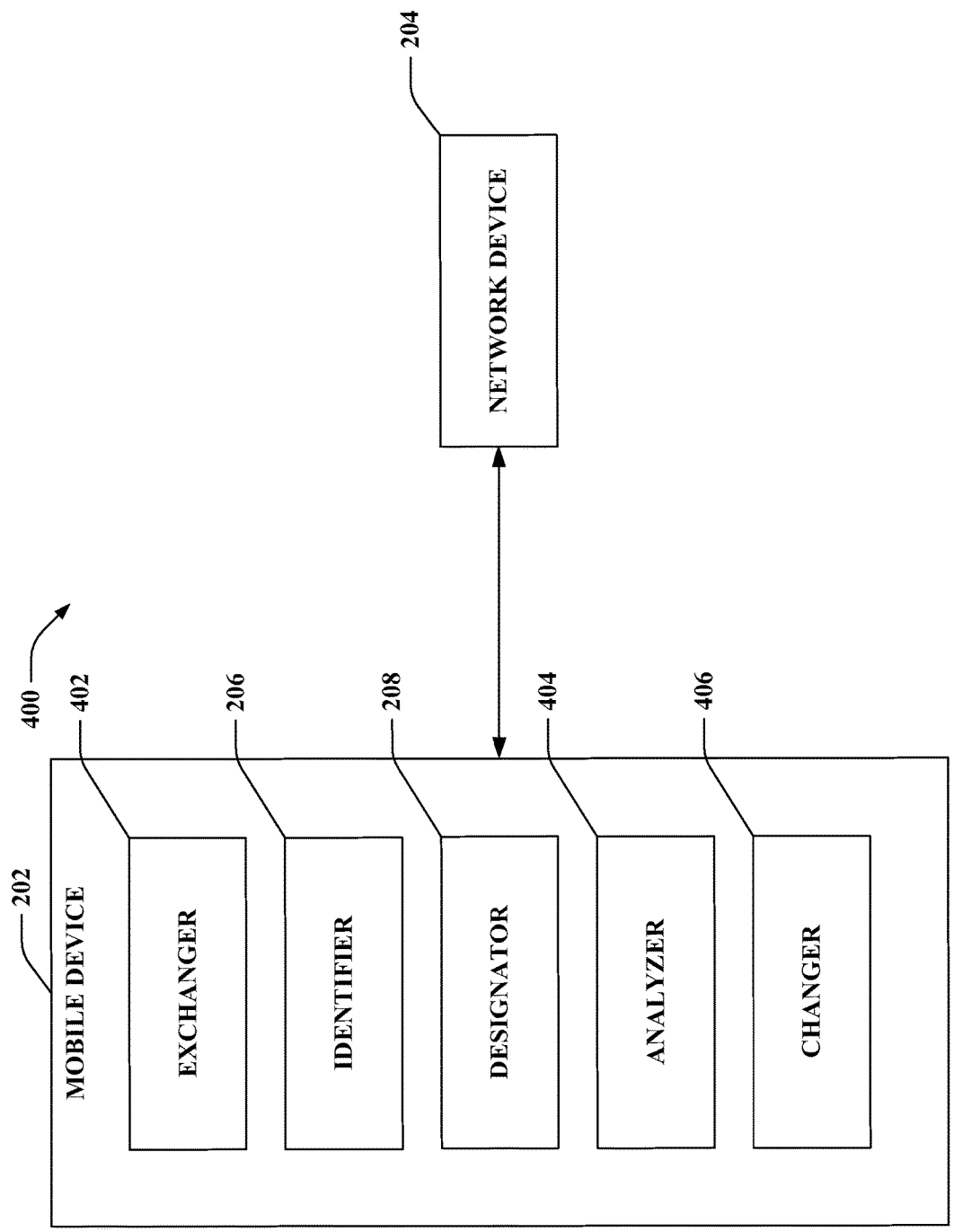
FIG. 4 is an illustration of a representative system for communication re-routing with a handover failure in accordance with at least one aspect disclosed herein.

Referring now to FIG. 4, an example system 400 is disclosed for processing a handover failure. An exchanger 402 can attempt to handover a communication session of the mobile device 202 from one base station to another base station (e.g., through communication with a mobile device 204), which can include changing a frequency. Upon engagement of the exchanger 402, an identifier 206 can monitor operation of the handover in an attempt to determine if there is a failure.

If a failure is identified (e.g., by the identifier 206), then there can be cell selection performed by a designator 208. According to one embodiment, cell selection occurs through intelligent selection (e.g., through artificial intelligence techniques). An analyzer 404 can evaluate various aspects of the system 400 (e.g., at least one cell characteristic, at least one characteristic of the mobile device 202, an instruction from a user, a rule set, etc.) and a result of the evaluation can be used to select the cell.

It is to be appreciated that artificial intelligence techniques can be used to practice determinations and inferences disclosed in the subject specification. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party. A changer 406 can transfer the mobile device 202 to the new cell and/or revert operation to a previous frequency.

Figure 5:
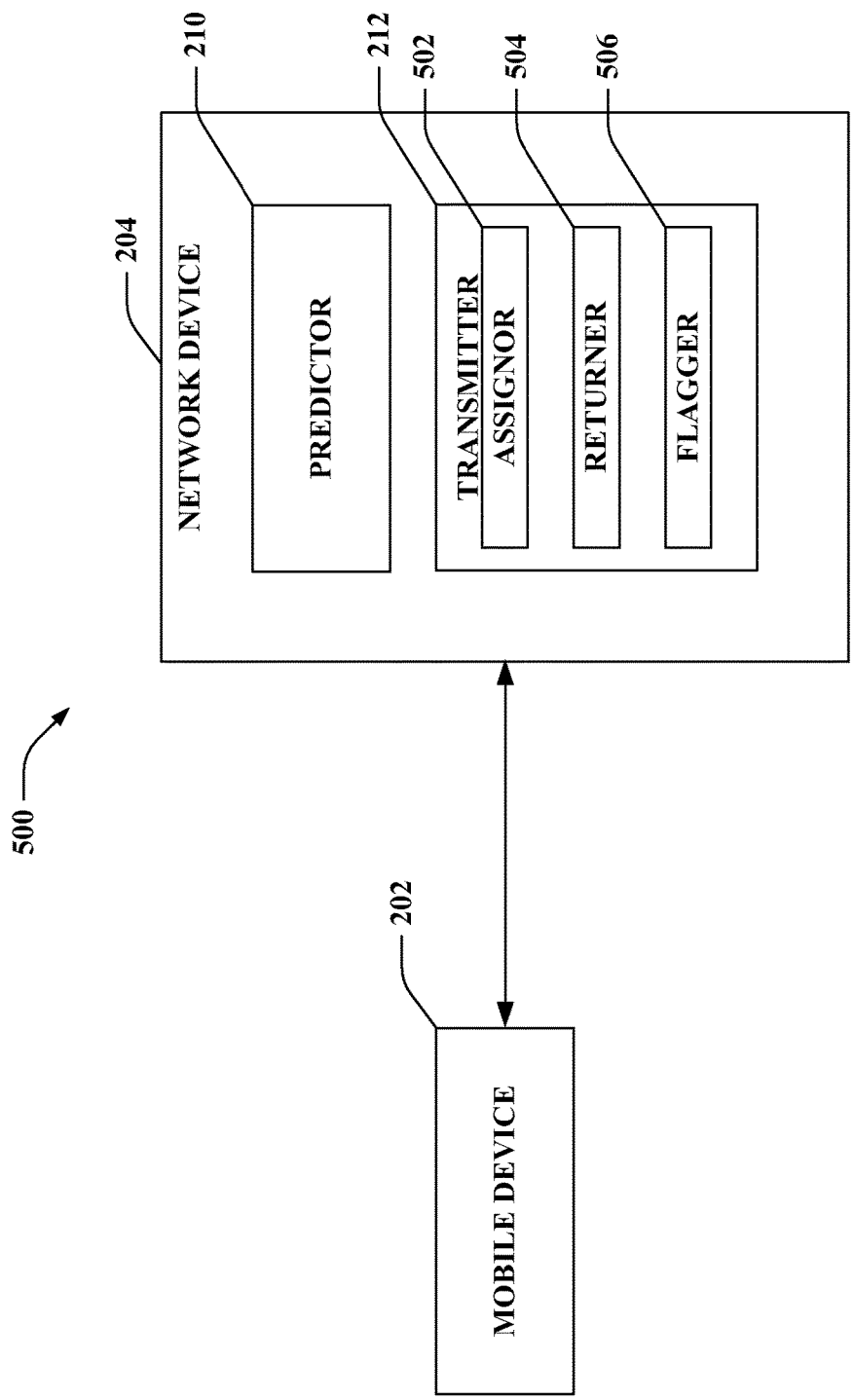
FIG. 5 is an illustration of a representative system for detailed network transmission in relation to a handover failure in accordance with at least one aspect disclosed herein.

Now referring to FIG. 5, an example system 500 is disclosed for instructing a mobile device 202 on how to operate upon a handover failure. As opposed to operating upon the mobile device 202, there can be determinations on how the mobile device 202 should operate with a handover failure performed upon a network device 204. The network device 204 can include a predictor 210 that anticipates a handover failure for user equipment. Anticipation can include estimating that a failure is likely to occur (e.g., based upon a result of analyzing metadata and implementing a predictive model) as well as identifying an actual failure.

A transmitter 212 can be employed that instructs the user equipment on how to operate based upon the anticipated handover failure—such as a frequency to use and/or a cell upon which to transfer. An appropriate cell for the mobile device 202 to return to can be selected and an assignor 502 can instruct the user equipment to return to a particular cell (e.g., the selected cell). In addition, there can be a change in frequency when the handover is attempted—as part of transferring to the cell there can be operation of a returner 504 that instructs the user equipment to revert to a frequency of a previous serving cell. Additionally, the returner 504 can instruct the mobile device 202 to remain on a current frequency or to transfer to another frequency that is not the previous frequency.

To facilitate operation, the transmitter 212 can employ a flagger 506 that transfers a flag to the user equipment—the flag commonly includes instruction information. According to one embodiment, the flag is transferred through a dedicated signaling or through a system information broadcast. Once the flag is obtained, the instruction is appreciated, the instruction is followed, etc., then the mobile device 202 can send confirmation to the network device 204.

Figure 6:
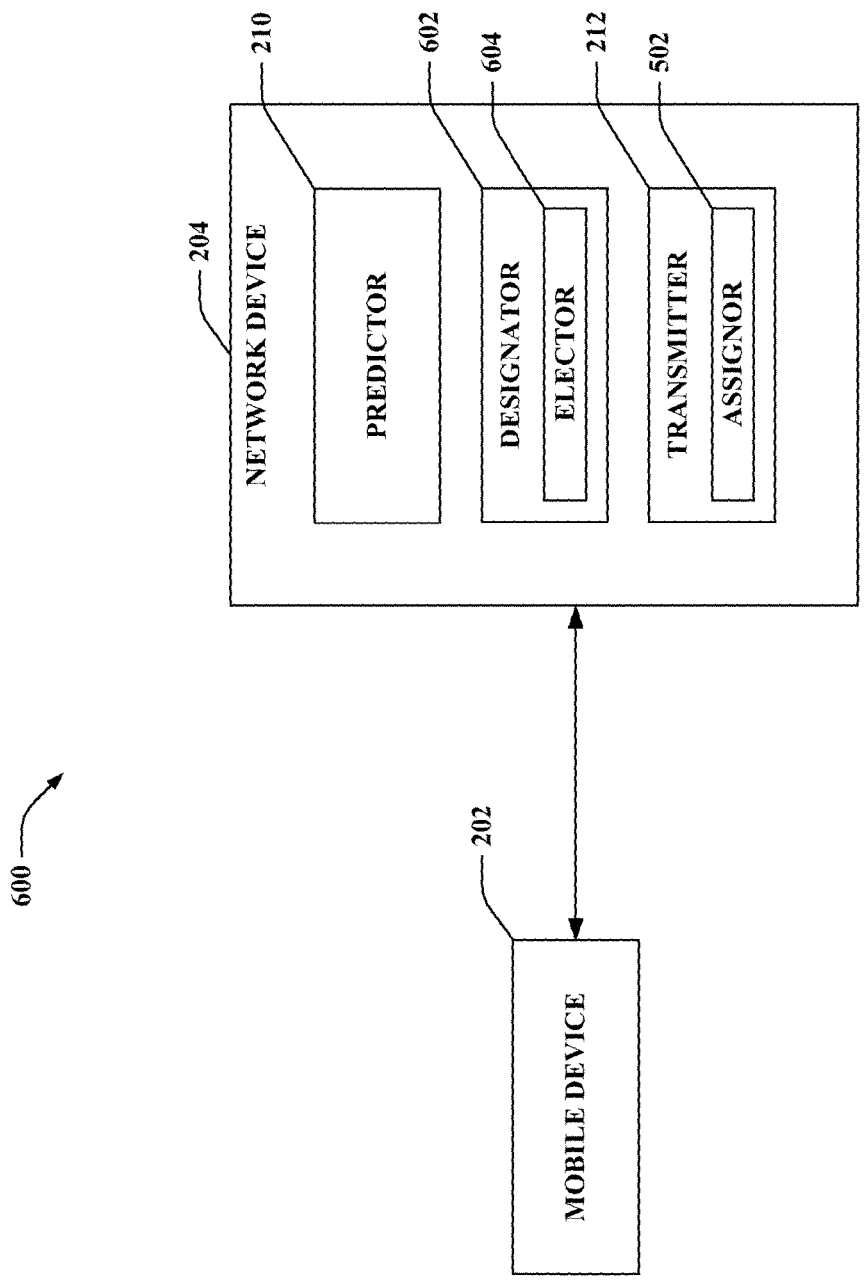
FIG. 6 is an illustration of a representative system for communication of cell selection in accordance with at least one aspect disclosed herein.

Now referring to FIG. 6, an example system 600 is disclosed for determining how to proceed regarding a handover failure. A mobile device 202 and network device can be in communication with one another when a handover failure occurs. The network device 204 can use a predictor that anticipates a handover failure for user equipment (e.g., the mobile device 202).

Upon anticipation of a handover failure, there can be a determination on what cell the mobile device 202 should use. A designator 602 can be employed that intelligently selects (e.g., through use of an artificial intelligence technique) a particular cell upon which the user equipment should return. According to one embodiment, the designator 602 uses an elector 604 that selects an optimized cell.

A transmitter 212 can instruct the user equipment on how to operate based upon the anticipated handover failure. The transmitter 212 can use an assignor 502 that instructs the user equipment to return to a particular cell. In one implementation, the mobile device 202 and the network device 204 can determine a cell upon which the mobile device 202 should return. The mobile device 202 can compare the two selected cells and if there is a match the cell can be used (e.g., the mobile device 202 transfers to the matching cell). However, if there is a conflict (e.g., two different cells are provided), then a determination can be made (e.g., by the mobile device) on which cell to use.

Figure 7:
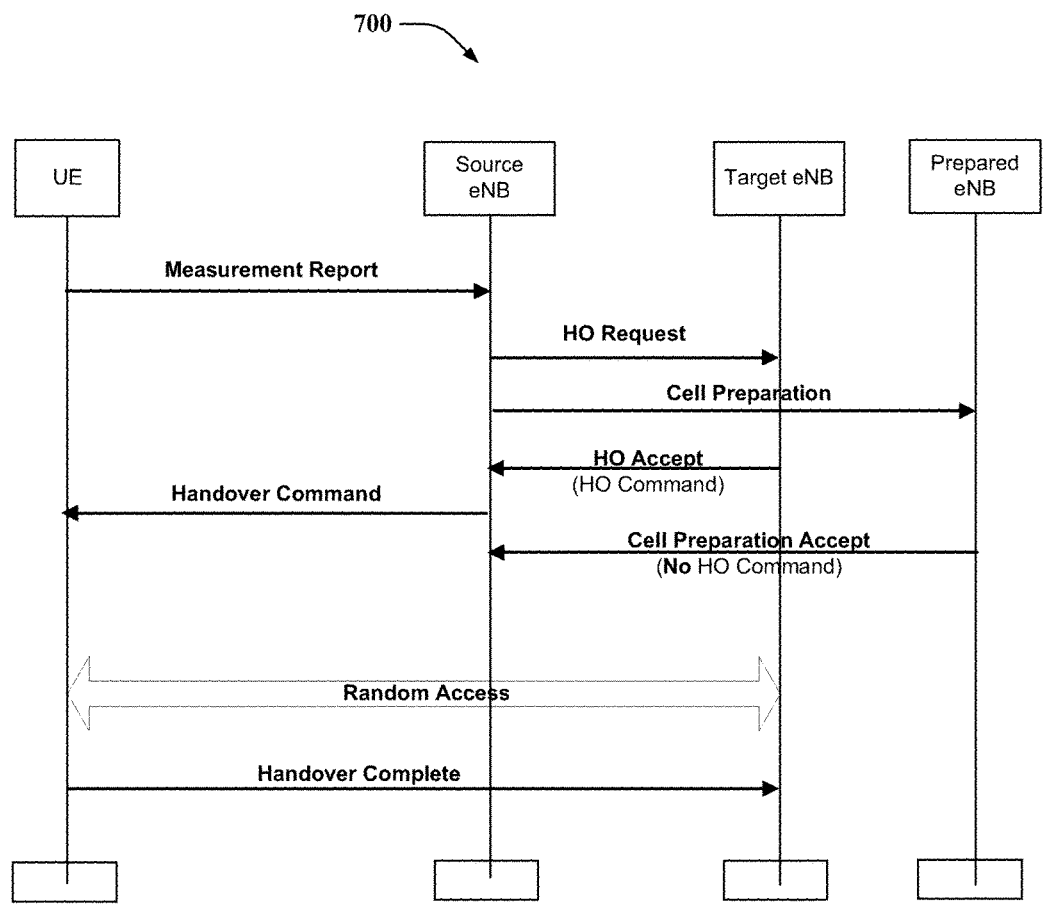
FIG. 7 is an illustration of a representative configuration for communication between a mobile device and at least one network device in accordance with at least one aspect disclosed herein.

Referring to FIG. 7, an example configuration 700 is disclosed for processing a handover procedure. In EUTRA (Evolved UMTS (Universal Mobile Telecommunications System) Terrestrial Radio Access), the Radio Resource Control protocol should support handover failure procedure (e.g., supports that can also operate in a similar manner regarding UTRAN (UMTS Terrestrial Radio Access Network). With UTRAN, the UE can revert back to the source cell if it fails in the synchronization to the target cell. It is possible that it is not always the best choice to go back to the source cell, the possibility of using Radio Link Failure Recovery procedure in case of handover failure can be used in accordance with aspects disclosed herein.

When a serving eNB initiates the eNB (evolved Node B) preparation procedure can occur at handover time. In a scenario where the source eNB performs eNB preparation, the UE (User Equipment) context transferred to other eNBs can be based on configurations before taking into account a handover command. This can be because a source eNB does not typically try to understand contents of handover command built by the target eNB. It can also be possible that the target eNB prepares other eNBs. There can be an assumption that eNB preparation is performed by the source eNB. It should be noted that the target eNB can also be a part of "prepared set" in the sense that it is aware of the UE context before the application of configurations in the handover command.

This shows that in case of handover failure, the UE can revert back to the old configuration (e.g., undoing handover command) and attempt to access the network. This can be the same as a UTRAN case where the UE behaves as if the reconfiguration message for handover has not been received. There can also be a question on whether the UE should go back to the source cell as can be performed in UTRAN. While it can be beneficial purely from a connection continuation point of view (since the UE context is surely be there), there can also be importance in respecting a principle that the UE access the best cell in terms of radio quality in the frequency. It can be possible that there are network deployment scenarios in which the source cell remains as the best cell in some cases, (e.g., inter-frequency handover due to load balancing, a system with frequency reuse more than one). Therefore, there can be use of the UE behavior to revert back to the previous frequency in case of handover failure (e.g., in case of intra-frequency handover it is implicitly the same frequency). The UE further selects the best cell in that frequency so that it will not create undesirable interference in the system. If, for example, the inter-frequency handover happens when the radio quality of the serving cell is good enough, but because of load balancing purpose, it is likely that the UE selects the source cell after handover failure.

The UE behavior can be controlled by the network since the network can be in a better position to know the network deployment and policies (e.g., especially in terms of mobility). This can be achieved by simply having a flag indicating whether the UE should or should not perform cell transfer. The flag can be provided either in a dedicated signaling (e.g. handover command) or in the system information broadcast.

Thus, there can be handover failure handling that maximizes reliability for connection continuation, by allowing the UE goes back to the source cell when network deployment scenarios allow it. In case of handover failure, the UE can revert back to the frequency of previous serving cell. Then the UE can select the best cell in the frequency. RLF recovery procedure can be used for handover failure recovery (e.g., no specific procedure/message for the case that the UE goes back to the source cell). The network can have a control over UE behavior after handover failure. A flag set by the network in a dedicated signaling or in the system information broadcast is used for this purpose.

Figure 8:
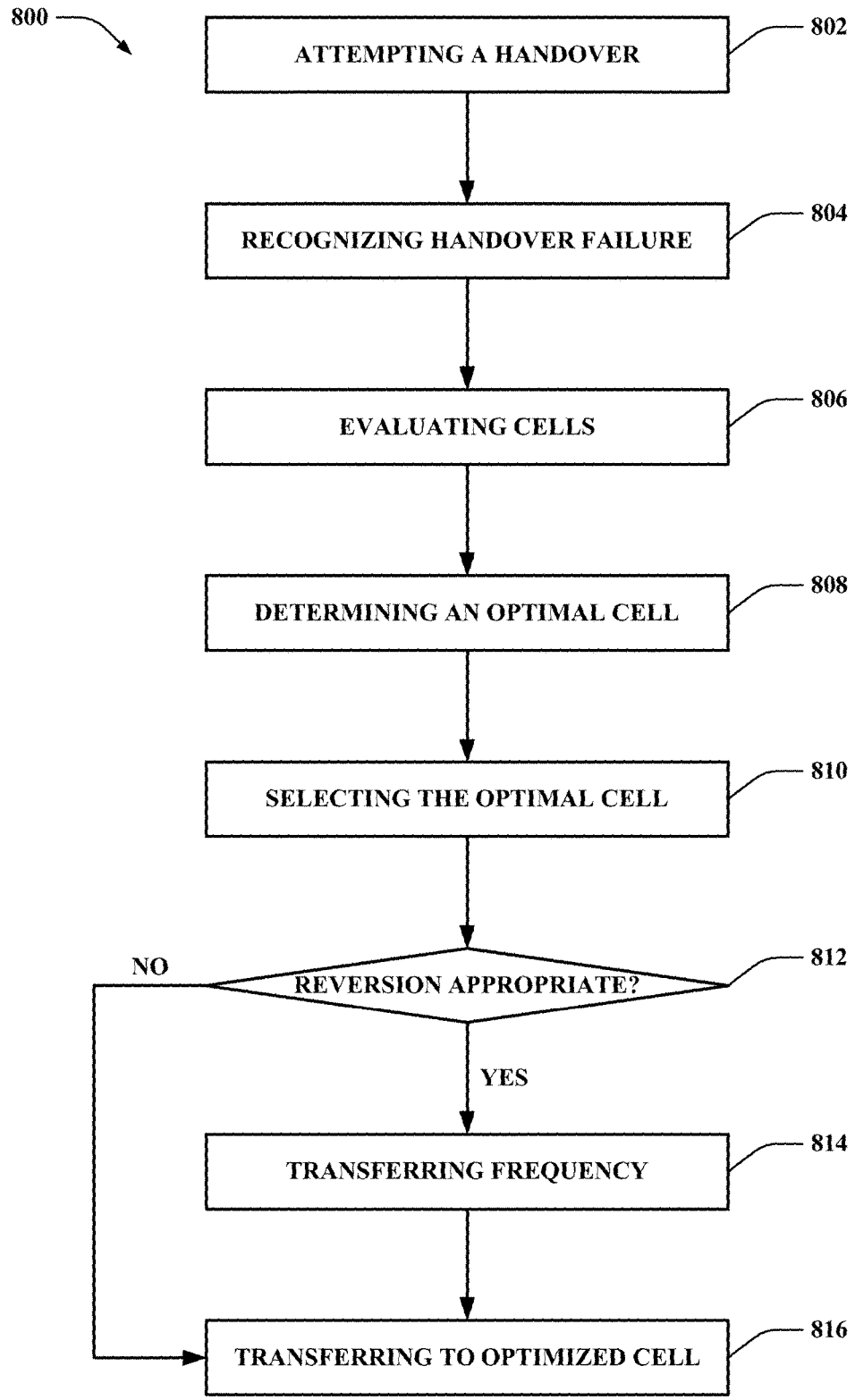
FIG. 8 is an illustration of a representative methodology for local handover failure operation in accordance with at least one aspect disclosed herein.

Now referring to FIG. 8, an example methodology 800 is disclosed for processing a failure for a handover, commonly regarding mobile device operation. Attempting a handover of a mobile device from one base station to another can occur at action 802. The handover can be analyzed to determine a failure—upon anticipating or determining that there is a failure, there can be appreciating a handover failure in relation to user equipment transferring among base stations at act 804. Act 804 can include determining that there is the handover failure.

Potential cells upon which to transfer the mobile device upon the failure can be evaluated at action 806. Constraints upon which a cell should be selected can be accessed and a determination can be made on which cell is optimal at event 808. A result of the evaluation is used to determine an appropriate cell. Based upon the determination, at event 810 there can be selecting a cell upon which to apply to the user equipment upon making the appreciation (e.g., through intelligent selection).

In addition to selecting a cell, a check 812 can be performed to determine if there should be reversion to a previous frequency (e.g., immediately previous)—for example the check 812 can determine if another frequency should be used to transfer a mobile device to a selected cell. If the check determines there should be a reversion, then there can be reverting operation to a previous frequency at act 814 (e.g., the user equipment changes frequency upon attempting the handover at action 802). However, if reversion should not occur, then there can be transferring to the optimized cell at action 816 that is selected at event 810.

Figure 9:
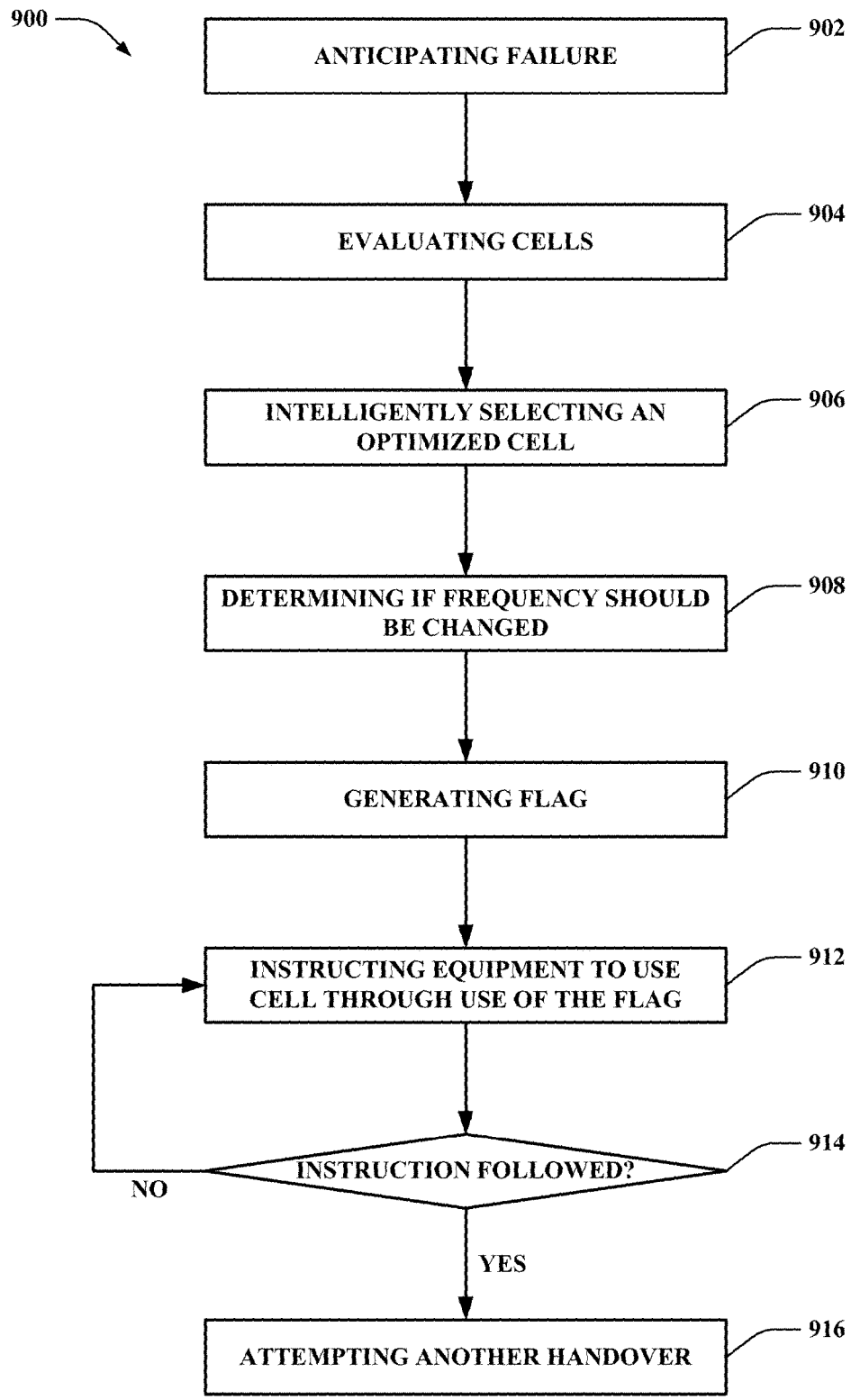
FIG. 9 is an illustration of a representative methodology for network handover failure operation in accordance with at least one aspect disclosed herein.

Now referring to FIG. 9, an example methodology 900 is disclosed for processing a failure for a handover, commonly regarding network operation. A handover attempt can occur and there can be anticipating of a handover failure for user equipment that takes place at action 902. Prior to the failure (e.g., as part of a continuous operation) and/or upon the failure different cells can be evaluated at act 904. In addition to cell evaluation, the user equipment can be evaluated, there can be evaluation of a communication type engaged by the user equipment, etc.

At event 906, there can be intelligent selection of a particular cell upon which the user equipment should return—the selection can be made based upon a result of the evaluation. According to one embodiment, the selection can be for an optimized cell. A determination can be made at action 908 that frequency reversion should occur; at act 910, there can be instructing the user equipment to revert to a frequency of a previous serving cell.

Through event 912, instructing the user equipment on how to operate (e.g., a cell upon which to return) based upon the anticipated handover failure can occur, which can include instructing the user equipment to return to a particular cell. According to one embodiment, the user equipment can be notified of the instruction trough transferring a flag to the user equipment. This can implement such that transferring the flag is performed through a dedicated signaling or through a system information broadcast.

A check 914 can be run to determine if the user equipment successfully follows the instruction (e.g., transfers to the selected cell). If the instruction is not followed, then event 912 can be run again (e.g., the instructions sent again). It is to be appreciated that other implementations can be practiced. For example, the user equipment can make a final determination on if the instruction should be followed and therefore the instruction sent once. However, a confirmation can be transferred notifying that the instruction is received. In addition to transferring the instruction, relevant metadata can also be transferred (e.g., rationale on why an instruction is made). Upon arriving at a cell (e.g., a previous cell, a selected cell, etc.), there can be attempting another handover at act 916.

Figure 10:
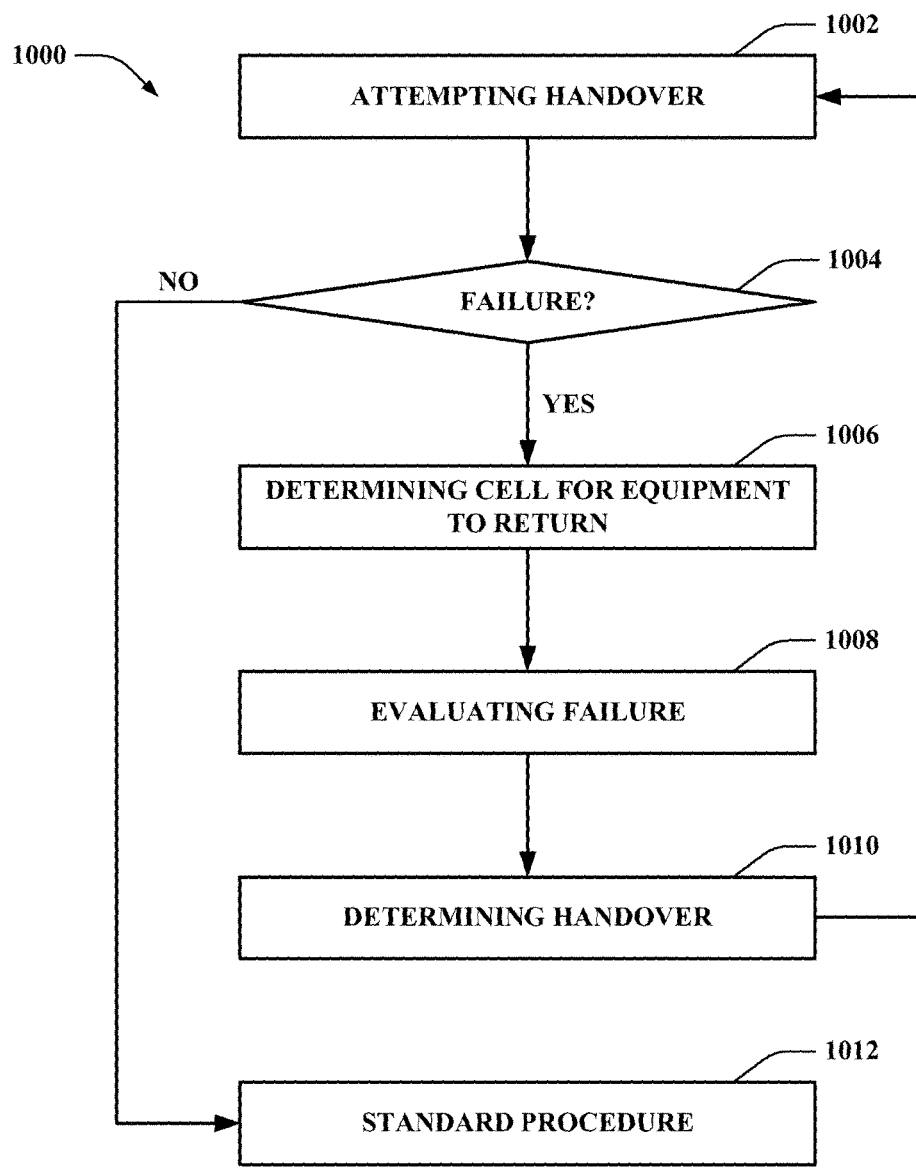
FIG. 10 is an illustration of a representative methodology for processing a handover in accordance with at least one aspect disclosed herein.

Now referring to FIG. 10, an example methodology 1000 is disclosed for processing a handover attempt. A handover of user equipment from one base station to another can occur at action 1002. Monitoring (e.g., continuous, periodic, etc.) can occur of the handover and a check 1004 can take place to determine if there is a failure with the handover—the failure can be that the mobile device cannot access a certain base station within a set amount of time.

If there is a failure, then a cell upon which the user equipment should return can be determined at event 1006. Once determined, user equipment can become notified of the cell and attempt to transfer to the cell. The failure can be evaluated (e.g., metadata associated with the failure) at act 1008 to determine why the failure occurred. Another determination can be made on a handover that should occur such that a base station is selected for a transfer through action 1010. For example, if it is determined that the failure occurred through heavy traffic on the base station and the base station is free of such traffic, then the base station that had the failure occur can be re-selected—however, a new base station can also be selected if appropriate. If check 1004 determines that there is not a failure, then standard procedure can take place at act 1012 (e.g., preparing for monitoring of a new handover such that the methodology 1000 can be re-run).

Referring to FIGS. 8-10, methodologies relating to a handover failure are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding a cell to be used regarding handover failure, a frequency to be used for handover failure, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to intelligent selection described herein. It will be appreciated that the foregoing examples are illustrative in nature and are not intended to limit the number of inferences that can be made or the manner in which such inferences are made in conjunction with the various embodiments and/or methods described herein.

Figure 11:
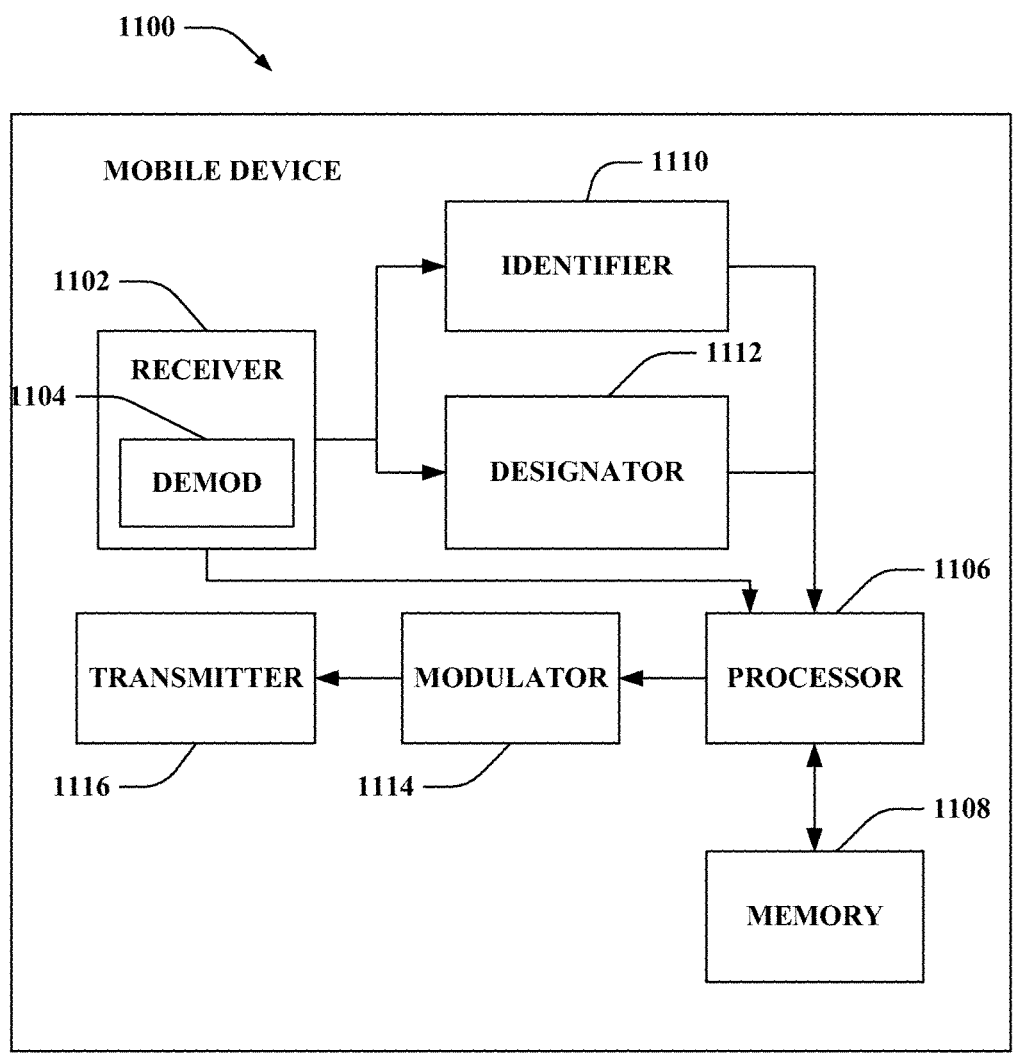
FIG. 11 is an illustration of an example mobile device that facilitates locally processing a handover failure in accordance with at least one aspect disclosed herein.

FIG. 11 is an illustration of a mobile device 1100 that facilitates cell selection for a handover failure. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1102 is further operatively coupled to an identifier 1110 and/or a designator 1112. The identifier 1110 can be used for appreciating a handover failure in relation to user equipment transferring among base stations. In addition, the designator 1112 can be used for selecting a cell upon which to apply to the user equipment upon making the appreciation. Mobile device 1100 still further comprises a modulator 1114 and a transmitter 1116 that transmits a signal (e.g., base CQI and differential CQI) to, for instance, a base station, another mobile device, etc. Although depicted as being separate from the processor 1106, it is to be appreciated the identifier 1110 and/or designator 1114 can be part of processor 1106 or a number of processors (not shown).

Figure 12:
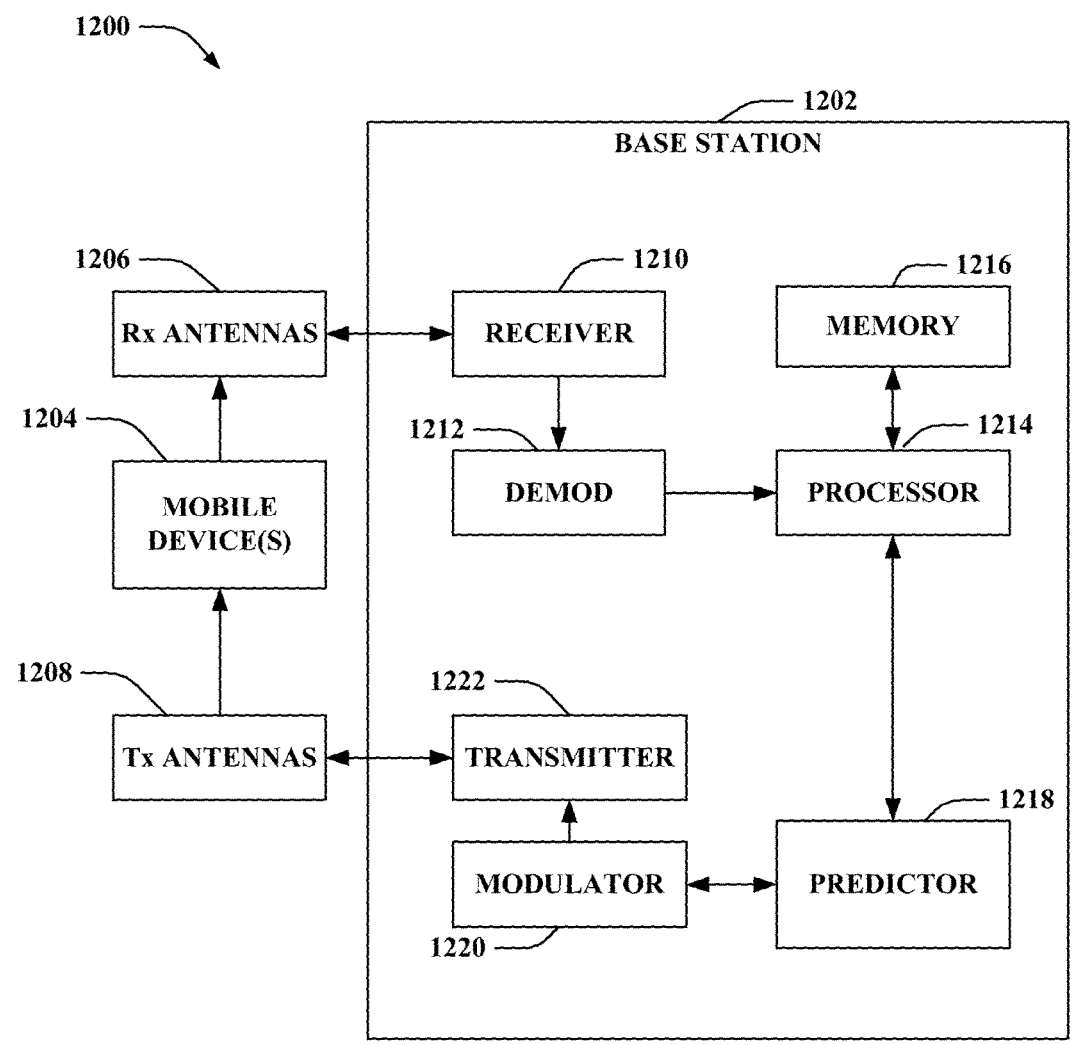
FIG. 12 is an illustration of an example system that facilitates processing a handover failure regarding a network in accordance with at least one aspect disclosed herein.

FIG. 12 is an illustration of a system 1200 that facilitates instructing how to proceed with a handover failure. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a plurality of transmit antennas 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further coupled to a predictor 1218 that anticipates a handover failure for user equipment. Information to be transmitted can be provided to a modulator 1220. Modulator 1220 can multiplex the information for transmission by a transmitter 1222 through antenna 1208 to mobile device(s) 1204. In addition, the transmitter 1222 can operate such that there is instruction of the user equipment on how to operate based upon the anticipated handover failure. Although depicted as being separate from the processor 1214, it is to be appreciated that predictor 1218 and/or transmitter 1222 can be part of processor 1214 or a number of processors (not shown).

Figure 13:
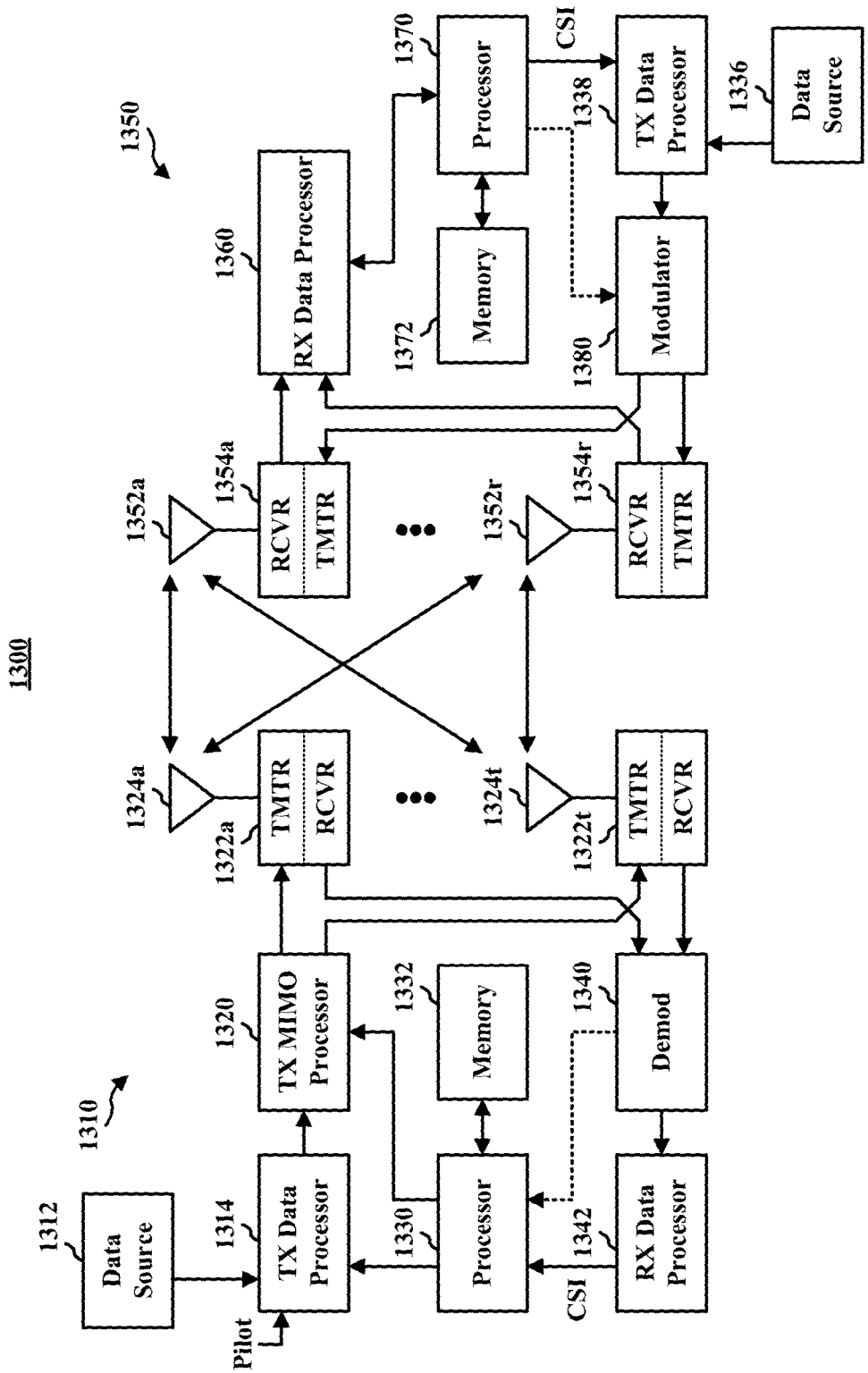
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-7 and 11-12) and/or methods (FIGS. 8-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
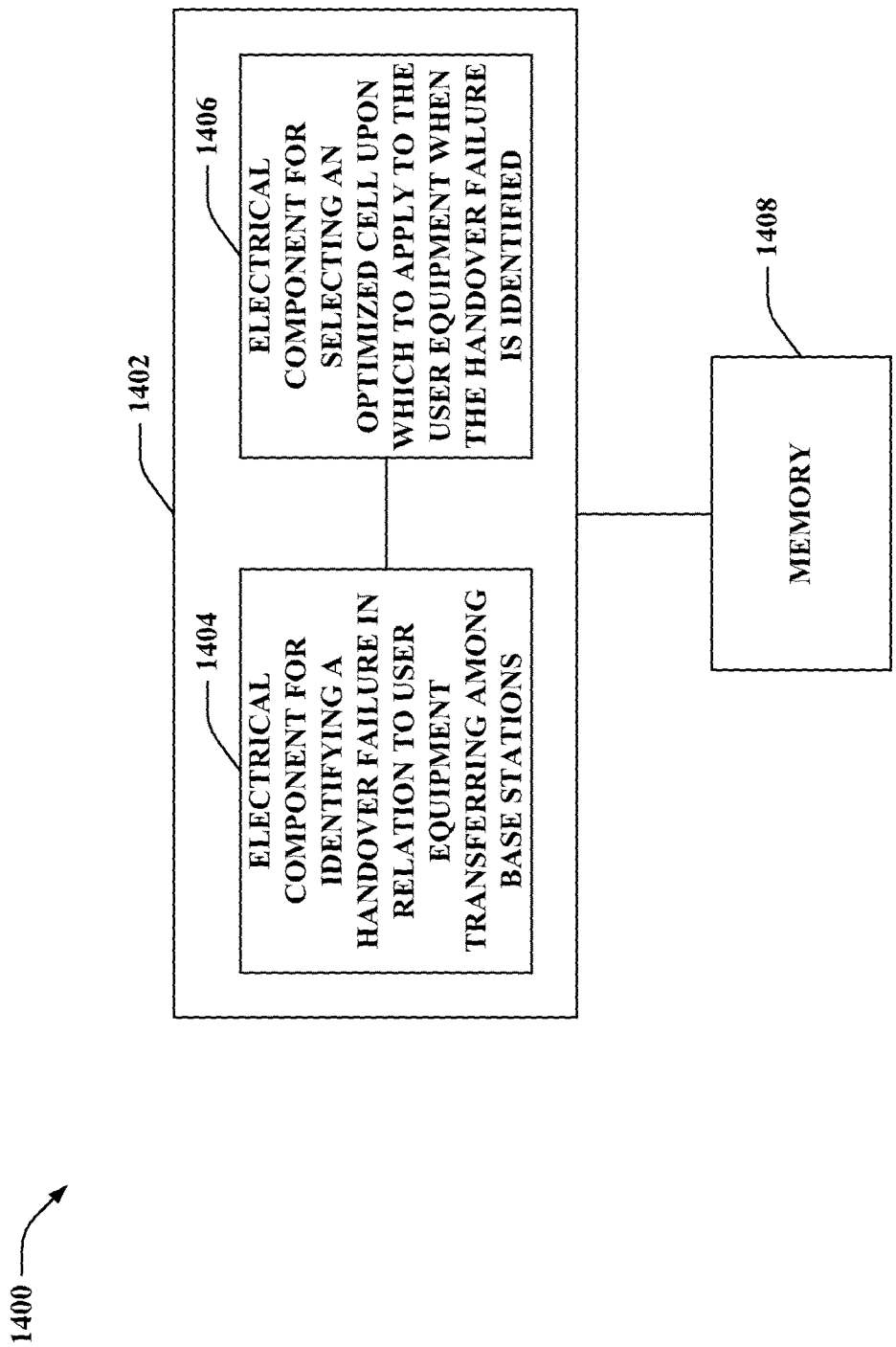
FIG. 14 is an illustration of an example system that facilitates cell selection concerning a handover failure in accordance with at least one aspect disclosed herein.

With reference to FIG. 14, illustrated is a system 1400 that effectuates handover failure management. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for appreciating a handover failure in relation to user equipment transferring among base stations 1404 and/or an electrical component for selecting a cell upon which to apply to the user equipment upon making the appreciation 1406. Additionally, the logical grouping 1402 can include an electrical component for determining that there is the handover failure, an electrical component for selecting an optimized cell (e.g., intelligent selection), an electrical component for evaluating at least one cell characteristic, an electrical component for reverting operation to a previous frequency, the user equipment changes frequency upon attempting the handover, and/or an electrical component for attempting the handover. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

Figure 15:
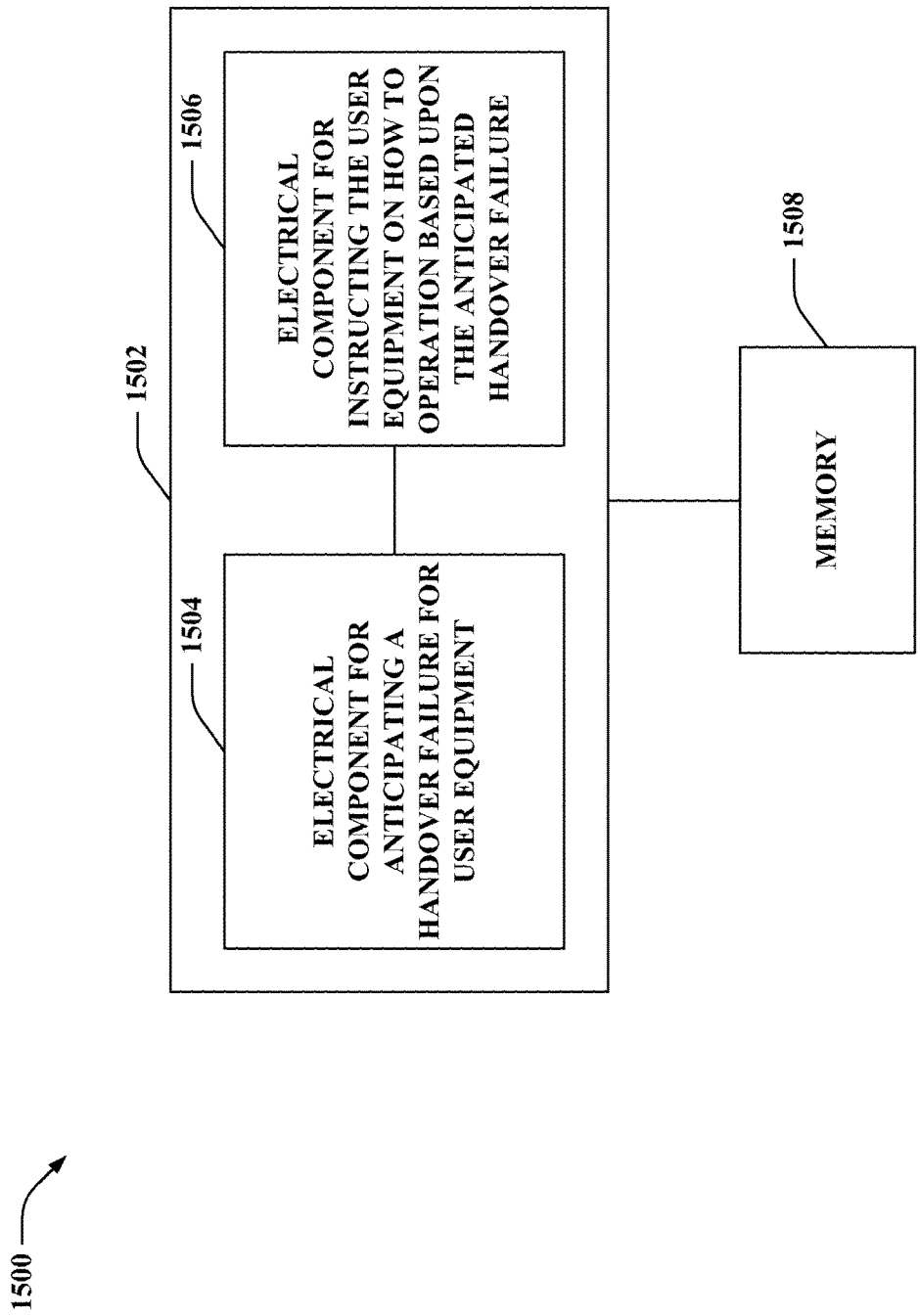
FIG. 15 is an illustration of an example system that facilitates instructing on how to proceed regarding a handover failure in accordance with at least one aspect disclosed herein.

Turning to FIG. 15, illustrated is a system 1500 for management of user equipment regarding a handover failure. As depicted, system 1500 includes functional blocks that can represent functions implemented by a processor, software, or combination thereof (e.g., firmware). System 1500 includes a logical grouping 1502 of electrical components that facilitate controlling forward link transmission. Logical grouping 1502 can include an electrical component for 1504 anticipating a handover failure for user equipment and/or an electrical component for instructing the user equipment on how to operate based upon the anticipated handover failure 1506. The logical grouping 1502 can also include an electrical component for instructing the user equipment to return to a particular cell, an electrical component for intelligently selecting the particular cell upon which the user equipment should return, an electrical component for selecting an optimized cell, an electrical component for instructing the user equipment to revert to a frequency of a previous serving cell, and/or an electrical component for transferring a flag to the user equipment (e.g., through a dedicated signaling or through a system information broadcast). Additionally, system 1500 can include a memory 1508 that retains instructions for executing functions associated with electrical components 1504 and 1506. While shown as being external to memory 1508, it is to be understood that electrical components 1504 and 1506 can exist within memory 1508.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for managing a wireless communication handover operable upon a user equipment (UE), comprising:
    identifying, by the user equipment, a handover failure in relation to transferring of the user equipment among base stations;
    selecting, by the user equipment, an optimized cell in which to transfer the user equipment when the handover failure is identified, wherein the user equipment selects the optimized cell by evaluating at least one cell characteristic and selecting the cell based on a result of the evaluation; and
    reverting operation of the user equipment to a previous cell when the optimized cell is the previous cell, wherein the pervious cell is a prior cell to which the UE unsuccessfully attempted to handover.

2. The method of claim 1, wherein selecting the optimized cell includes at least one of:
    selecting a cell anticipated to have a lowest amount of interference for the user equipment; and
    selecting a cell as a function of load balancing among at least two cells.

3. The method of claim 1, further comprising reverting operation of the user equipment to a previous frequency upon attempting the handover.

4. A user equipment (UE), comprising hardware components including:
    an identifier that identifies a handover failure in relation to transferring the user equipment among base stations; and
    a designator that selects an optimized cell in which to transfer the user equipment when the handover failure is identified, wherein the designator selects the optimized cell by evaluating at least one cell characteristic and selecting the cell based on a result of the evaluation,
    wherein the designator reverts operation of the user equipment to a previous cell when the optimized cell is the previous cell, wherein the pervious cell is a prior cell to which the UE unsuccessfully attempted to handover.

5. The user equipment of claim 4, wherein selection of the optimized cell includes at least one of:
    selection of a cell anticipated to have a lowest amount of interference for the user equipment; and
    selection of a cell as a function of load balancing among at least two cells.

6. The user equipment of claim 4, further comprising a changer that reverts operation of the user equipment to a previous frequency upon attempting the handover.

7. A user equipment (UE), comprising:
    means for identifying a handover failure in relation to transferring of the user equipment among base stations;
    means for selecting an optimized cell in which to transfer the user equipment when the handover failure is identified, wherein the means for selecting the optimized cell selects the optimized cell by evaluating at least one cell characteristic and selecting the cell based on a result of the evaluation; and
    means for reverting operation of the user equipment to a previous cell if the optimized cell is the previous cell, wherein the pervious cell is a prior cell to which the UE unsuccessfully attempted to handover.

8. The user equipment of claim 7, wherein the means for selecting the optimized cell includes at least one of:
    means for selecting a cell anticipated to have a lowest amount of interference for the user equipment; and
    means for selecting a cell as a function of load balancing among at least two cells.

9. The user equipment of claim 7, further comprising means for reverting operation of the user equipment to a previous frequency upon attempting the handover.

10. A non-transitory computer-readable storage medium comprising:
    a set of codes for causing a user equipment (UE) to identify a handover failure in relation to transferring of the user equipment among base stations;
    a set of codes for causing the user equipment to select an optimized cell in which to transfer the user equipment when the handover failure is identified, wherein the set of codes for causing the user equipment to select the optimized cell includes a set of codes for causing the user equipment to evaluate at least one cell characteristic and a set of codes for causing the user equipment to select the cell based on a result of the evaluation; and
    a set of codes for causing the user equipment to revert operation of the user equipment to a previous cell when the optimized cell is the previous cell, wherein the pervious cell is a prior cell to which the UE unsuccessfully attempted to handover.

11. The computer-readable medium of claim 10, wherein the set of codes for causing the user equipment to select the optimized cell includes at least one of:
    a set of codes for causing the user equipment to select a cell anticipated to have a lowest amount of interference for the user equipment; and a set of codes for causing the user equipment to select a cell as a function of load balancing among at least two cells.

12. The computer-readable medium of claim 10, further comprising a set of codes for causing the user equipment to revert operation of the user equipment to a previous frequency upon attempting the handover.

13. A user equipment (UE) comprising:
    at least one processor configured to:
        identify a handover failure in relation to transferring of the user equipment among base stations;
        select an optimized cell in which to transfer the user equipment when the handover failure is identified, wherein the at least one processor is configured to select the optimized cell by evaluating at least one cell characteristic and selecting the cell based on a result of the evaluation;
        revert operation of the user equipment to a previous cell when the optimized cell is the previous cell, wherein the pervious cell is a prior cell to which the UE unsuccessfully attempted to handover; and
    a memory coupled to the at least one processor.

14. The user equipment of claim 13, wherein the at least one processor is configured to select the optimized cell by at least one of:
    selecting a cell anticipated to have a lowest amount of interference for the user equipment; and
    selecting a cell as a function of load balancing among at least two cells.

15. The user equipment of claim 13, wherein the at least one processor is further configured to revert operation of the user equipment to a previous frequency upon attempting the handover.

\* \* \* \* \*